Nov. 6, 1928.    1,690,898
G. H. HART
TIME AND TEMPERATURE CONTROL OF HEATING ELEMENTS
Filed March 4, 1927
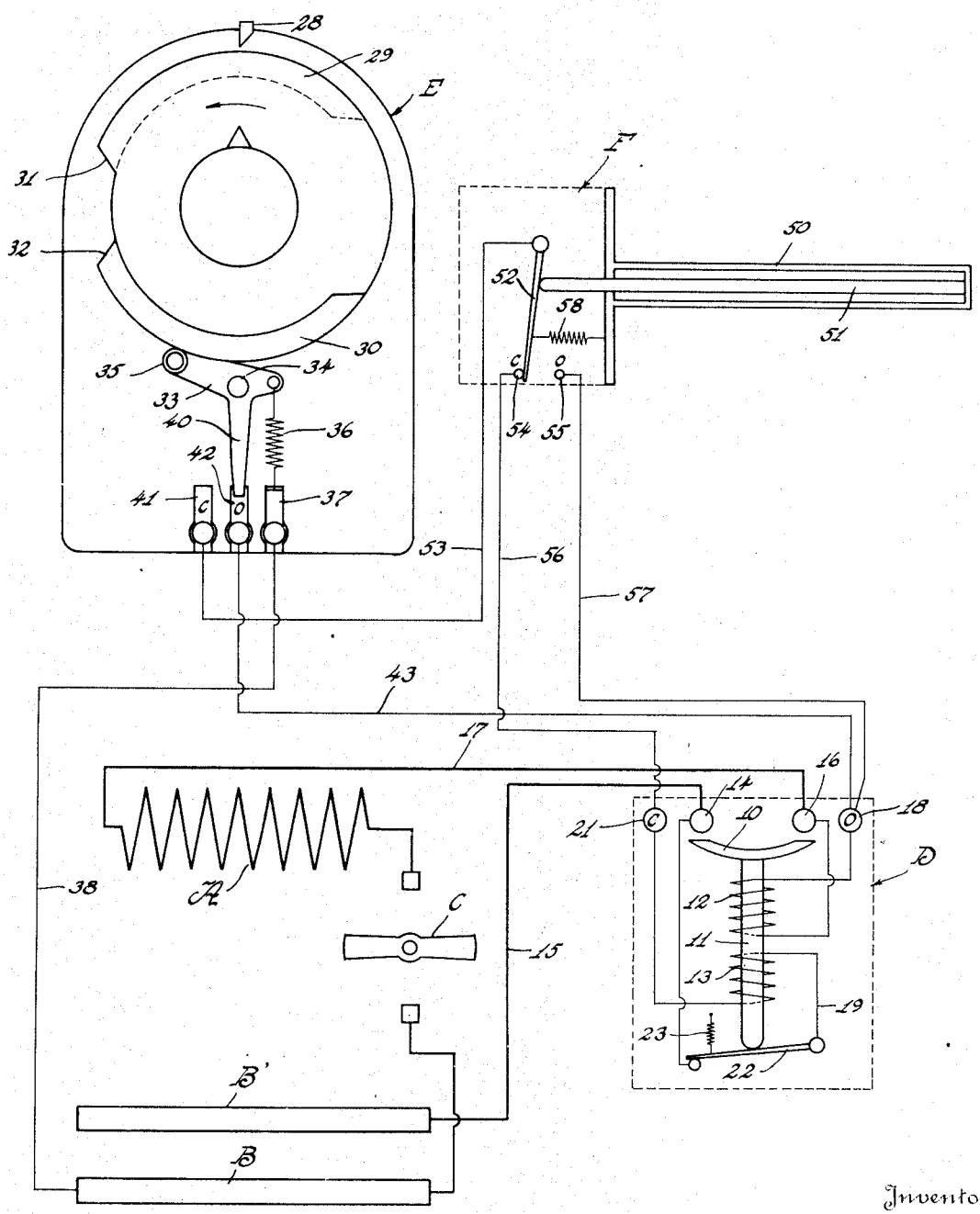
Inventor
George Hegeman Hart
By T. Clay Lindsey.
His Attorney Patented Nov. 6, 1928.

1,690,898

UNITED STATES PATENT OFFICE.

GEORGE HEGEMAN HART, OF WEST HARTFORD, CONNECTICUT.

TIME AND TEMPERATURE CONTROL OF HEATING ELEMENTS.

Application filed March 4, 1927. Serial No. 172,662.

This invention relates, generally, to arrangements wherein heating elements, such as a heating coil or coils of an electric range, are automatically controlled thermostatically and by timing mechanism, and the invention has as its aim to provide an arrangement of this sort having various features of novelty and advantage.

As an instance of a use to which the improvements of the present invention may be applied, reference may be had to an electric cooking range wherein it is desirable to automatically throw the current onto and off of the heating element or elements at predetermined times, and also to maintain a substantially uniform temperature during the heating or cooking period by thermostatically controlling the heating element or elements. As my improvements are peculiarly adapted for use in connection with a cooking range, I have herein disclosed the same so applied, but it is to be understood that the present disclosure is by way of illustration only, my improvements being susceptible of various modifications and changes.

I am aware that it has been proposed to control the heating element or elements of a range by a time switch and a thermostat, and I make no broad claims to this combination, the present invention being directed to the manner in which the various instrumentalities are connected up so as to bring about the desired results.

The object of the present invention is to provide an improved arrangement wherein the various instrumentalities are connected up in a simple and effective manner, the connections being reduced to a minimum, and the cost of manufacture and installation being greatly lessened.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawing:

The figure is a schematic view showing, more or less diagrammatically, my improved control.

Referring to the drawing in detail, A designates, generally, a heating element which, for instance, may be located within the oven of an electric range. Obviously, more than one heating element may be provided, and these heating elements may be so connected up as to give heats of different intensities, as is usual in electric ranges. B and B' designate bus bars which may be carried by the range, and C is a manually operable switch of any suitable type. The elements A, B, B' and C are shown purely diagrammatically, as, obviously, the arrangement and application of these elements may be varied, as desired. More than one switch may be provided, and these switches may be mounted upon the bus bars in the manner disclosed in my application Serial No. 719,455, filed June 11, 1924.

D designates, generally, a magnetic switch which is employed for making and breaking the current through the heating element. While this switch D may be of any suitable type, it is here shown diagrammatically as having a main switch or circuit breaker which includes a circuit closer 10, and a pair of contacts 14 and 16. The circuit closer 10 is provided with a stem or armature 11 about which are an opening coil 12 and a closing coil 13. In the present instance, one of the contacts 14 is connected by a wire 15 to the bus bar B', and the other contact 16 is connected to the heating element by a wire 17. One end of the opening coil is connected to the contact 16 and the other end is connected to a post 18. One end of the closing coil is connected by a wire 19 to the contact 14, and the other end of the closing coil is connected to a post 21. Interposed in the wire 19 is an auxiliary switch provided with a pivoted member 22, movement of which is controlled by the armature or stem 11. This switch is closed when the circuit breaker is in open position, as shown in the figure. When the circuit breaker is in closed position, the switch member 22 is held open by a spring 23.

The letter E designates, generally, a timer which also is shown diagrammatically, as the particular construction thereof forms no part of the present invention. For a more detailed disclosure of a timer which may be employed in this connection, reference may be had to my co-pending application Serial No. 172, 661.

This timer is here illustrated as having a pair of disks 29 and 30 adjustable relative to one another and driven in unison by a clock mechanism (not illustrated). Portions of the peripheries of these disks are cut away, and the cutaway portions have opposed shoulders 31 and 32, the angular distance between which determines the length of time that the switch associated with this timer is held in a given position. This switch, in the present illustrative disclosure, comprises a switch plate 33 pivoted as at 34 and having a roller 35 adapted to ride against the peripheries of the disks. The switch plate is resiliently urged against the peripheries of the disks by a spring 36 which also serves to electrically connect the switch plate to a post 37. This post is connected by a wire 38 to the bus bar B. The switch plate also has a tongue or contact 40 adapted to be thrown into alternate engagement with a pair of contacts 41 and 42. The contact 42 is connected by a wire 43 to the post 18 which, as previously stated, is connected to one end of the opening coil 12.

F designates, generally, a thermostatic device which is also shown diagrammatically, as the particular construction thereof forms no part of the present invention. By way of illustration, this thermostatic device is shown as having a part or tube 50 formed of a material having a relatively high co-efficient of expansion and a part or rod 51 which is relatively non-expansible. The tube 50 with the rod therein may be positioned within the oven of the range (for instance) so as to be affected by the heat thereof. The rod engages against a pivoted switch arm 52 which is connected by a wire 53 to the terminal or contact 41 of the time switch. The switch arm 52 is adapted to be moved alternately into engagement with the contacts 54 and 55, the former being connnected to the post 21 by a wire 56, and the latter to the post 18 by a wire 57. A spring 58 normally urges the switch arm 52 towards the contact 55.

For convenience in following the circuits, those contacts and terminal posts which are associated with the opening coil 12 of the magnetic switch bear the letter o, and those contacts and terminal posts which are associated with the closing coil 13 bear the letter c.

The operation of the arrangement is briefly as follows: Assuming that the disks 29 and 30 are rotated in a counterclockwise direction by the clock mechanism, the disk or dial 29 will be set relative to a fixed pointer 28 so that the shoulder 31 will be an angular distance from the roller 35 corresponding to the elapsed time between the setting of the device and the time that the cooking period is to end, and the disk 30 is adjusted relative to the disk 29 so that the angular distance between the shoulders 31 and 32 will correspond to the actual desired cooking period. The manually operable switch C is thrown into one of its "on" positions, depending on the temperature desired, and the thermostat will be adjusted to maintain the oven substantially at the desired temperature during the cooking period. The apparatus having been set, the train of gears of the clock mechanism will rotate the disks counterclockwise. Should the main switch of the magnetic device D be inadvertently "on," it will be thrown off during the setting of the timer when the portion of larger radius of the disk 30 is brought into engagement with the roller 35, for when the contact 40 engages the contact 42, the current will flow from bus bar B through the wire 38, spring 36, switch plate 33, wire 43, the opening coil 12, circuit closer 10, and the line wire 15 to the bus bar B'. When current thus passes through the opening coil, the main switch is opened. The magnetic switch will remain open while the roller 35 is in engagement with the periphery of the portion of larger radius of the disk 30 so that there is no heat passing through the heating unit. Since the thermostat is cool (i. e. the tube 50 is contracted), the switch arm 52 is held in engagement with the contact 54. When the shoulder 32 comes opposite the roller 35, the switch plate 33, under the influence of the spring 36, will be moved into engagement with the contact 41 so that a current will flow from the bar B through the wire 38, spring 36, switch plate 33, contact 41, wire 53, switch arm 52, contact 54, wire 56, closing coil 13, wire 19 and line wire 15 to the bus bar B' with the result that the magnetic switch is closed. When the magnetic switch is thus closed, the auxiliary switch 22 is opened by the spring 23, and the current through the heating coil is as follows: the manually operable switch C, the heating coil A, the wire 17, circuit closer 10 and the wire 15 to the bus bar B'. After the oven has been heated up to a predetermined point, the tube 50 of the thermostat will have expanded to such an extent that the spring 58 will move the switch arm 52 into engagement with the contact 55, whereupon a current will flow from the bus bar B through the wire 38, spring 36, switch plate 33, wire 53, switch arm 52, wire 57, the opening coil 12, the circuit closer 10 and the wire 15 to the bus bar B', with the result that the main switch of the magnetic device is opened to break the circuit through the heating element A. The magnetic switch will remain open until the oven cools down slightly, whereupon the thermostat will again move the switch arm into engagement with the contact 54 with the result that a current will again flow through the closing coil thereby closing the circuit closer 10 and causing a current to again pass through the heating element. During the cooking period, that is while the roller 35 is riding on the reduced portions of the disks between the shoulders 31 and 32, the thermostatic device will operate as just described so that a uniform heat is maintained in the oven. At the end of the cooking period, the roller 35 will ride up the shoulder 31 and onto the portion of larger radius of the disk 29, so that the time switch is thrown into the position shown in the drawing. In the event the magnetic switch is closed when the time switch is thus thrown into engagement with the contact 42, it is immediately thrown open as a current will momentarily flow through the opening coil.

I claim as my invention:

1. In combination, a circuit including a heating element; a magnetic device having a switch interposed in said circuit and having an opening coil and a closing coil; a timing mechanism having a switch; a thermostatic device having a switch; and electrical connections arranged to cause said time switch to be in series with said opening coil and said thermostatic switch to be cut out when said time switch to be in one position, said time switch is in series with said thermostatic switch when the former is in its other position, and said thermostatic switch when in one position to be in series with said opening coil and in its other position to be in series with said closing coil.

2. In combination, a circuit including a heating element; a magnetic device having a switch interposed in said circuit and having an opening coil in series with said switch, said magnetic device also having a closing coil; a timing mechanism having a switch; a thermostatic device having a switch; and electrical connections connecting said time switch in series with said opening coil independently of said thermostatic switch when said time switch is in one position, connecting said time switch in series with said thermostatic switch when the former is in its other position, and connecting said thermostatic switch when in one position in series with said opening coil and in its other position in series with said closing coil.

3. In combination, a circuit having a heating element; a magnetic device having a main switch interposed in said circuit, an opening coil in series with said main switch, a closing coil, and an auxiliary switch in series with said closing coil and controlled by said main switch; a time switch having a time operated switch member with a contact electrically connected to said opening coil, and a second contact; and a thermostatically operated switch having a switch member connected to said second contact, said thermostatically operated switch having a contact connected to said closing coil and a contact connected to said opening coil.

4. In combination, a circuit including a heating element, a magentic device having a main switch interposed in said circuit and having an opening coil in series with said switch, said device also having an auxiliary switch controlled by said main switch and a closing coil in series with said auxiliary switch, a timing mechanism having a switch, a thermostatic device having a switch, and electrical connections between said time switch and opening coil independent of said thermostatic switch, between said time switch and thermostatic switch, between said thermostatic switch and said opening coil, and between said thermostatic switch and said closing coil.

5. In combination, a circuit including a heating element, a magnetic device having a switch interposed in said circuit and having an opening coil and a closing coil, a timing mechanism, and a thermostatic device having a switch, said timing mechanism having a switch selectively connectible in series with said opening coil independently of said thermostatic switch and with said thermostatic switch, and said thermostatic switch being selectively connectible with said opening coil and said closing coil.

6. In combination, a circuit including a heating element, a magnetic device having a switch interposed in said circuit and having an opening coil and a closing coil, a timing mechanism having a switch, a thermostatic device having a switch, an electrical connection between said time switch and said opening coil, an electrical connection between said time switch and said thermostatic switch, an electrical connection between said thermostatic switch and opening coil, and an electrical connection between said thermostatic switch and closing coil.

GEORGE HEGEMAN HART.